United States Patent [19]

Burden et al.

[11] 4,343,845

[45] Aug. 10, 1982

[54] ELASTOMERIC STRIP AND METHOD OF MANUFACTURING SAME

[75] Inventors: Martin J. Burden, Fort Mill, S.C.; Richard C. Williams, Pittsford, N.Y.

[73] Assignee: Schlegel Corporation, Rochester, N.Y.

[21] Appl. No.: 173,485

[22] Filed: Jul. 30, 1980

[51] Int. Cl.$^3$ .......................... B32B 15/08; E06B 7/22
[52] U.S. Cl. ...................................... 428/122; 49/490; 264/177 R; 264/285; 428/188
[58] Field of Search ............... 428/83, 122, 358, 188; 264/177 R, 285

[56] References Cited

U.S. PATENT DOCUMENTS

| | | | |
|---|---|---|---|
| 3,198,689 | 8/1965 | Lansing | 428/122 X |
| 3,462,903 | 8/1969 | Kronbetter | 52/400 |
| 4,042,741 | 8/1977 | Bright | 428/188 X |

OTHER PUBLICATIONS

The Title Page, The Verso of the Title Page, pp. 21 and 22 of "Organic Chemistry of Synthetic High Polymers", Interscience Publishers, New York, London and Sydney.
The Title Page, The Verso of the Title Page, pp. 232 and 233 of "Hackh's Chemical Dictionary", McGraw-Hill Book Company, New York, San Francisco, Toronto, London, Sydney.

Primary Examiner—Henry F. Epstein
Attorney, Agent, or Firm—Cumpston & Shaw

[57] ABSTRACT

An elastomeric strip has a support frame having selected regions of longitudinally displaceable frame portions such as wire loops reinforced by degraded and non-degraded materials that are non-degradable during the frame coating operation for inhibiting longitudinal displacement of the frame portions during the frame coating operation. The degraded material breaks down when the strip is flexed to allow increased flexibility of the strip, and the non-degraded material prevents undue elongation or stretching of the strip. A method of manufacturing the strip comprises reinforcing regions of the frame portions with degradable materials, arranging the reinforced support frame in position to be coated, coating the reinforced support frame with an elastomeric material, and then degrading selective regions of the degradable reinforcing materials.

17 Claims, 9 Drawing Figures

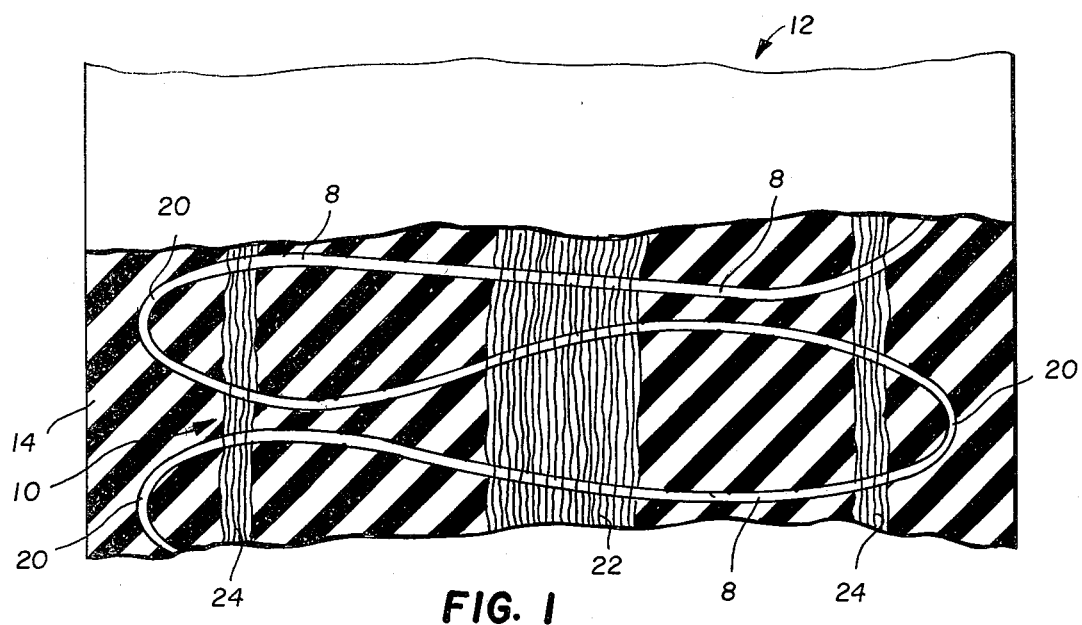
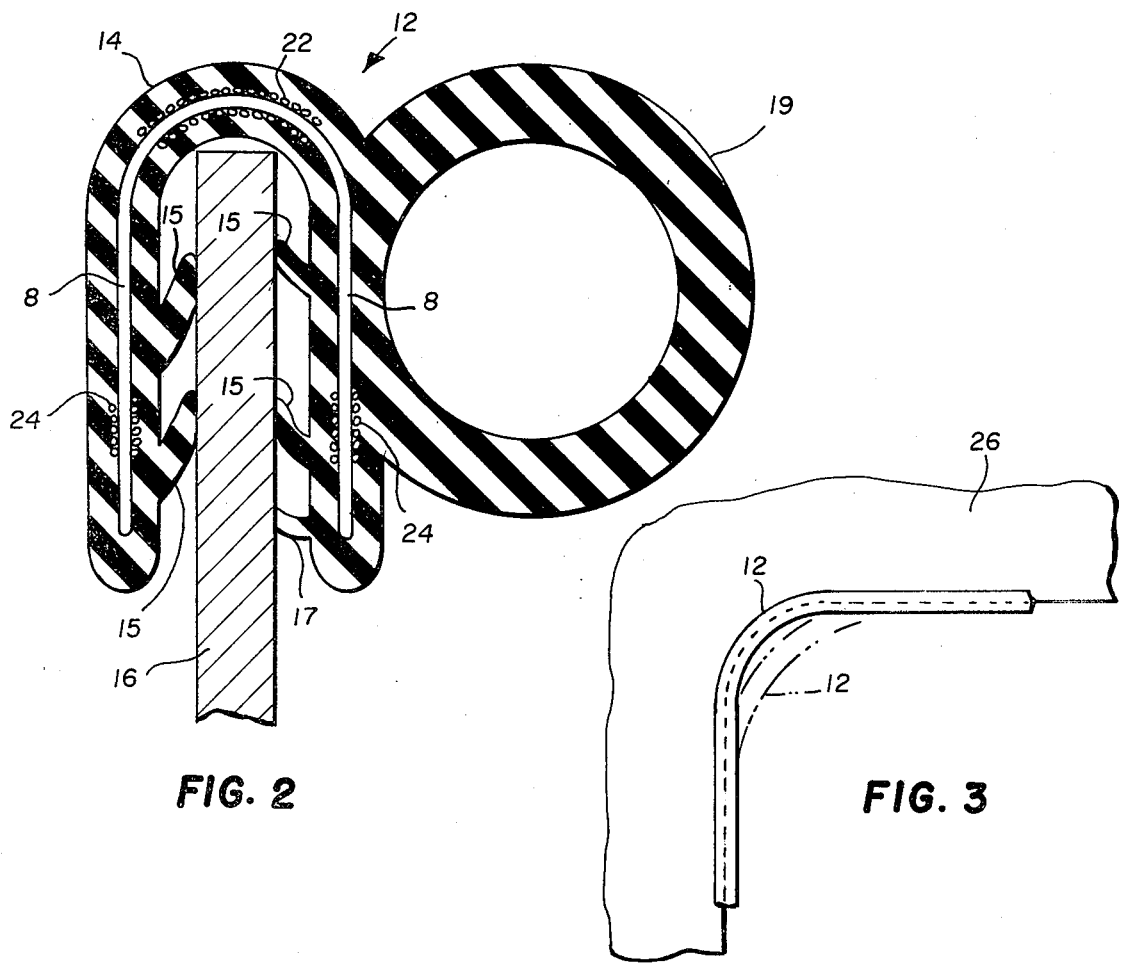
FIG. 1
FIG. 2
FIG. 3

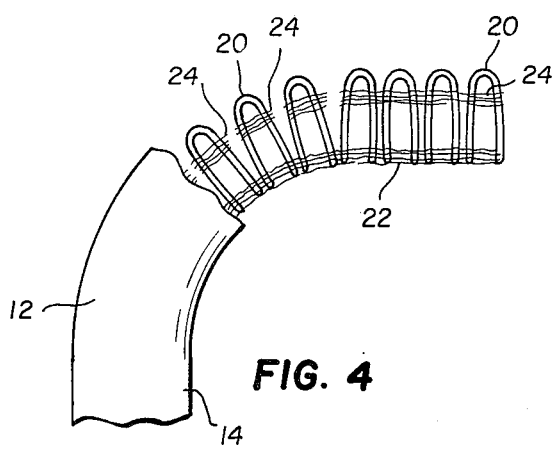
FIG. 4
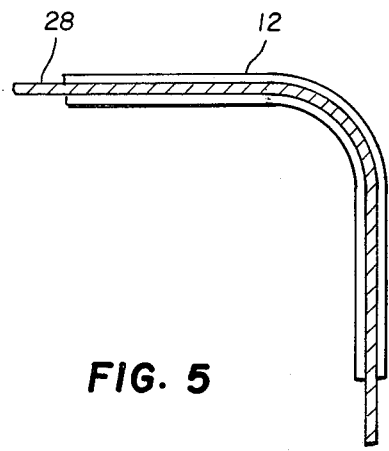
FIG. 5
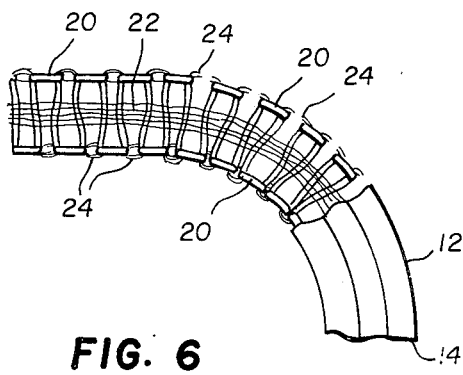
FIG. 6
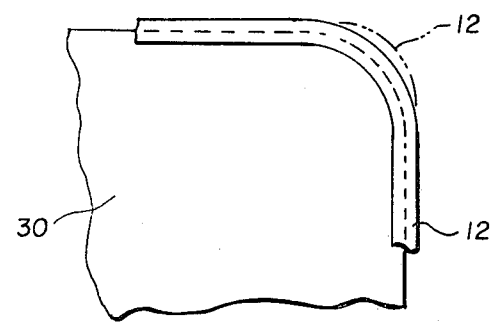
FIG. 7
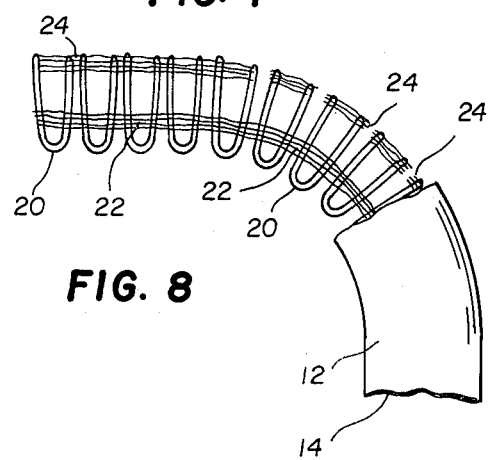
FIG. 8
FIG. 9

ELASTOMERIC STRIP AND METHOD OF MANUFACTURING SAME

BACKGROUND OF THE INVENTION

1. Field of the Invention

The invention relates to an elastomeric strip of improved flexibility, preferably of the channel-shaped type, for sealing and/or decorative purposes such as, for example, for gripping and covering edge flanges surrounding an opening in a vehicle body.

The invention further relates to a method of manufacturing the elastomeric strip of improved flexibility by reinforcing regions of longitudinally displaceable frame portions of the support frame of the strip with a degradable material(s), arranging the reinforced support frame in a position to be coated, coating the reinforced support frame with an elastomeric material, and then degrading selective regions of the degradable reinforcing material(s).

2. Description of the Prior Art

Coating processes are known for coating elastomeric material onto a support frame. The support frame may comprise, for example, a slotted metal frame having frangible metal webs on at least one side thereof, a ladder-like frame having a plurality of parallel, spaced apart metal rungs secured to a textile yarn or string on the sides thereof, or a serpentine or looped wire frame interwoven on the sides thereof with a yarn or string material. In one coating process, the support frame is fed through an extrusion die at a high rate of speed and an elastomeric material extruded thereon. At the high rate of speed involved, the hydraulic forces of the elastomeric material acting on the support frame in the extrusion die could cause possible longitudinal displacement of portions of the support frame and jamming of the extrusion die. Such longitudinal displacement was prevented in the slotted metal support frame by the metal webs and in the ladder and looped wire support frames by the yarn or string material which is interwoven with the ladder rungs or wire loops. Although the metal webs and yarn or string solved the problem of longitudinal displacement and jamming during extrusion, they presented another problem, that of limiting the longitudinal displacement of portions of the support frame and hence the flexibility of the sealing strip during installation and use thereof. This problem of limited or insufficient flexibility is particularly acute with the advent of smaller cars in which the sealing strip is required to negotiate inside, outside and lateral curved flanges of tighter radii. The sealing strip of limited flexibility cannot faithfully follow or accomodate small curves or radii resulting in buckling of the sealing strip and the formation of a leakage space between the flange and sealing strip. In those applications where the sealing strip is channel-shaped and has an elongated sealing bulb secured thereto, severe bending causes distortion of the bulb and possible leakage between the bulb and surface in sealing engagement therewith.

The problem of limited strip flexibility was solved for elastomeric strips having a slotted metal support frame by breaking the metal side webs. It was also solved for strips having a serpentine wire frame by conducting an electrical current through the wire which is heated sufficiently to burn the yarn or string knots or loops encircling the wire. A disadvantage of these solutions is that all of the material preventing longitudinal displacement of the support frame is destroyed or degraded causing excessive elongation of the strip to occur during application. Later, the applied strip retracts resulting in the formation of leakage areas.

SUMMARY OF THE INVENTION

In accordance with a preferred embodiment of this invention, an elastomeric strip is disclosed having selected regions of degraded frame reinforcing material which breaks down, when flexed, resulting in a strip of increased flexibility for accurately or faithfully negotiating curved surfaces of small radii. A method of manufacturing such an elastomeric strip involves reinforcing regions of longitudinally displaceable frame portions of a support frame for the elastomeric strip with degradable material(s). The reinforcing material(s) is maintained non-degradable during a subsequent coating operation in order to inhibit longitudinal displacement of the frame portions during the coating operation. The reinforced support frame is arranged or placed in a position to be coated with elastomeric material, and then coated to form an elastomeric strip. A selected region(s) of a degradable material(s) is then degraded and breaks down when the strip is flexed so that longitudinal displacement of the selected region(s) of the frame portions is no longer inhibited resulting in an elastomeric strip of improved flexibility. The unselected region(s) remain non-degradable for preventing undue elongation or stretching of the strip. More specifically, by reinforcing selected region(s) of the displaceable frame portions of the strip such as the central and/or outer regions or portions thereof with a degradable material(s) and subsequently selectively degrading it, increased flexibility to accomodate inside, outside and lateral curves, or combinations thereof and limited elongation of the strip is achieved.

In another aspect of the invention, the reinforcing material is heat degradable, and the temperature of the elastomeric material during the coating operation is less than the temperature at which the reinforcing material degrades so that no degradation of the reinforcing material occurs during the coating operation.

The aforementioned invention is believed to increase the flexibility of the elastomeric strip by degrading, weakening or destroying at least a portion of the reinforcing material inhibiting longitudinal displacement of the elastomeric strip support frame. When the strip is flexed upon installation the degraded reinforcing material breaks down or is weakened allowing the strip to more faithfully follow curved surfaces of small radii without excessive elongation or stretching of the strip. This is achieved without causing the strip or sealing bulb attached thereto to distort or buckle, thereby reducing the sealing effectiveness of the elastomeric strip.

The invention and its advantages will become more apparent from the detailed description of the invention presented below.

BRIEF DESCRIPTION OF THE DRAWINGS

The details of the invention will be described in connection with the accompanying drawings, in which:

FIG. 1 is an enlarged fragmentary plan view partly in section showing an elastomeric strip in flat condition before being bent into a channel shape and with a tubular sealing bulb omitted;

FIG. 2 is an enlarged view in section showing an elastomeric edge protector trim strip mounted on a flange and having the tubular sealing bulb affixed thereto;

FIG. 3 is a fragmentary view of an inside curved surface showing the applied position of a prior art edge protector sealing strip in dotted lines and of an edge protector sealing strip of this invention in full lines;

FIG. 4 is an enlarged fragmentary side elevational view partly in section of a curved portion of the inventive sealing strip of FIG. 3;

FIG. 5 is a fragmentary view of a side or laterally curved flange onto which a sealing strip of this invention is mounted with the tubular sealing bulb omitted;

FIG. 6 is an enlarged fragmentary side elevational view partly in section of a curved portion of the strip of FIG. 5;

FIG. 7 is a fragmentary view of an outside curved surface showing the applied position of a prior art sealing strip in dotted lines and of a sealing strip of this invention in full lines;

FIG. 8 is an enlarged fragmentary side elevational view partly in section of a curved portion of the inventive sealing strip of FIG. 7; and FIG. 9 is a block diagram showing some of the manufacturing steps followed to produce an elastomeric strip of improved flexibility.

DETAILED DESCRIPTION OF THE INVENTION

With reference to FIGS. 1 and 2, a preferred embodiment of the invention is shown embodied in a known type of support frame 10 of an edge protector sealing strip 12 coated by any suitable elastomeric or polymeric material 14. The frame may be coated with one material or with separate materials of different hardness, and then bent into a channel-shape as seen in FIG. 1 for application onto a flange 16 (FIG. 2). The edge protector sealing strip 12 has flange gripping fins 15, a sealing lip 17 and a bulb 19. Sealing strip 12 is exemplary only since the invention can be embodied in any other form of elastomeric strip such as an edge protector trim strip, or a glazing strip, for example, not shown, where a support frame 10 is used and increased flexibility of the elastomeric strip is desired without undue elongation or stretching thereof.

The support frame 10 preferably comprises a wire 8 arranged in a serpentine or looped path to provide looped portions 20 that are longitudinally displaceable prior to coating. Alternatively, the support frame 10 may comprise a metal ladder-type strip or woven textile material, for example, not shown. To prevent longitudinal displacement of the support frame 10 or portions 20 thereof due to the hydraulic forces generated during the coating operation, the frame portions heretofore were maintained in their spaced relation with one another by a reinforcing material, such as by interweaving with them a plurality of strands 22 of material that is non-degradable, that is, does not break down during and following the manufacture of the elastomeric strip. Such strands 22 were preferably interwoven adjacent the wire loops 20 at the edge regions of the frame, and a plurality of such strands 22 were interwoven through the central region of the frame. In the past, such strands 22 were formed, for example, from polyester, cotton, nylon, rayon, fiberglass or light wire. Although strands formed from such material achieve the objective of inhibiting longitudinal displacement of the looped portions, one disadvantage is that following formation of the sealing strip, such strands 22 continue to limit longitudinal displacement and hence the flexibility of the finished sealing strip 12 and its ability to faithfully follow flange curves of small radii. Specifically, with reference to dotted portions of FIGS. 3 and 7, the known type of sealing strip is unable due to its limited flexibility, to faithfully follow inside and outside curves respectively and assumes the dotted positions shown resulting in a leakage space between the sealing strip and flange.

This problem of limited flexibility was solved in the prior art by conducting an electric current through wire 8 causing the heated wire to burn the strands of material 22 so that longitudinal displacement of wire loops 20 was no longer prevented. A disadvantage of this solution, however, is that elongation of the elastomeric strip is now limited only by the characteristics of the elastomeric material resulting in excessive elongation of the elastomeric strip in use.

This invention overcomes the aforementioned disadvantage or objection to known ways of providing an elastomeric strip of increased flexibility by providing for selectively destroying or degrading selected regions of the frame reinforcing material so that the elastomeric strip is capable of faithfully following the curves as seen in full lines in FIGS. 3 and 7 without undue elongation of the strip. This is achieved as best seen in FIGS. 1, 4 and 8 by using strands 24, for example, of a reinforcing material that is selectively degradable following the coating operation. It may also be achieved by using different combinations of two different types of reinforcing materials of varying degradable properties, during the manufacturing steps for reinforcing the support frame. By a degradable material, we are referring to a material that is degradable to the extent that the reinforcing capacity of the material is eliminated or substantially reduced without degrading the remaining portions of the elastomeric strip including at least a part of the support frame reinforcing material.

One type of strand reinforcing material 22, referred to earlier, is polyester, for example, which has a relatively high degradation temperature of around 465° F. (240° C.). Since the temperatures reached during the normal processes of manufacturing the elastomeric strip are below 240° C., the polyester material does not melt, soften or degrade. Consequently, in the finished product, this type of reinforcing material continues to effectively limit longitudinal displacement of the support frame.

A second type of reinforcing material, preferably in strand form 24 of which polyethylene is exemplary, has a degradation temperature of around 240° F. (116° C.) which is lower than that of the polyester material, but sufficiently high such that the polyethylene retains its reinforcing strength during at least the coating step of manufacturing the elastomeric strip 12. However, during or after the elastomeric strip is made, it is subjected to heat degradation at a temperature slightly higher than the lower degradation temperature of about 116° C. Accordingly, at such higher temperature, the polyethylene 24 is melted or degraded more significantly than the polyester reinforcing material 22. When the finished elastomeric strip 12 is flexed during installation on a flange or the like, the degraded material breaks or gives allowing increased flexibility of the strip while the more temperature resistant material 22 retains its ability to inhibit longitudinal displacement of selected portions 20 of the support frame 10 and undue elongation or stretching of the strip.

The heat is applied during, for example, curing, vulcanization or a separate heating operation. The heating operation includes but is not limited to convection, conduction, radiation, microwave irradiation, or resistance heating by inducing or passing current through the support frame.

Degradation of a support frame reinforcing material by heat is exemplary only, and can also be accomplished by means other than heat. For example, degradation may be achieved by chemical or biochemical means, or by the application of appropriate forms of irradiation such as X-rays or ultraviolet light.

With reference to FIGS. 1, 4, 6 and 8, several examples are shown of elastomeric strips 12 having different flexibility characteristics depending upon where the degradable strands 24 of reinforcing material are located. If, as seen in FIG. 4, the reinforcing strands are selected and located such that the strands 24 in the outer region of the support frame 10 are degradable at a predetermined temperature, for example, relative to the strands 22 in the central region which are nondegradable at that temperature, and the elastomeric strip is subjected to the predetermined temperature, the outer strands 24 degrade whereas the central strands 22 remain non-degraded. When the elastomeric strip 12 is flexed as it is applied around an inside corner flange 26 as seen in FIG. 3, the outer degradable strands 24 break down (FIG. 4) and no longer inhibit longitudinal displacement of the looped portions 20 in the outer regions of the support frame 10 and strip 12. Accordingly, greater flexibility of the strip is achieved allowing the strip to faithfully follow the inside corner flange 26 as seen in full lines in FIG. 3. The central strands 22 remain non-degraded to provide longitudinal stability to the base or central region of the strip, and to limit excessive elongation of the strip.

Such an elastomeric strip 12 also inhibits increased flexibility when applied to curved flanges 28 requiring lateral or side flexing of the strip as seen in FIGS. 5 and 6. When so applied, the degradable strands 24 on the looped portions 20 of one or the other outer side region degrades (FIG. 6) depending upon the direction the strip is flexed allowing increased flexibility of the strip in either direction.

With reference to FIGS. 7 and 8, an elastomeric strip 12 is shown that exhibits increased flexibility when applied to an outside curved flange 30. To achieve this, the strands 24 in the base or central region of the strip are selected of a material 24 that is degradable under specified conditions whereas the strands 22 on the looped portions 20 in the outer regions are formed from a material 22 that is non-degraded under the same conditions. Accordingly, when the strip 12 is applied on the outer curved flange surface 30 as shown in FIG. 7, the center strands degrade or break down (FIG. 8) so that they no longer inhibit or limit longitudinal displacement of the central region of the support frame 10. Consequently, the strip 12 more faithfully follows the outer curved flange surface 30 as seen in full lines in FIG. 7 without excessive elongation of the strip.

The combination of selected strands 22, 24 that are degradable and non-degradable under specified conditions as shown in FIGS. 3–8 are exemplary only. For example, it is conceivable that all of the strands of reinforcing material used in the central and edge regions could be made of the same material and selective regions only of the material degraded resulting in an elastomeric strip of increased flexibility in a desired direction of flexing and of limited elongation or stretching.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method of manufacturing an elastomeric strip of improved flexibility comprising the steps of:
   reinforcing regions of longitudinally displaceable frame portions of a support frame with a degradable material to inhibit longitudinal displacement of the frame portions during the coating operation;
   arranging the reinforced support frame in a position to be coated with elastomeric material;
   coating the reinforced support frame with an elastomeric material to form an elastomeric strip without degrading the degradable material; and then
   degrading selective regions of the degradable reinforcing material after the support frame is coated so that longitudinal displacement of the selected regions of the frame portions is no longer inhibited resulting in an elastomeric strip of improved flexibility and limited elongation or stretching.

2. A method of manufacturing an elastomeric strip according to claim 1 wherein the elastomeric material is subjected during the degradation step to a temperature equal to or above the temperature at which the degradable material degrades.

3. A method of manufacturing an elastomeric strip according to claim 1 wherein the support frame comprises a wire frame.

4. A method of manufacturing an elastomeric strip according to claim 3 wherein the wire frame is arranged in a serpentine manner.

5. A method of manufacturing an elastomeric strip according to claim 4 wherein the selected region is the central region of the serpentine wire.

6. A method of manufacturing an elastomeric strip according to claim 4 wherein the selected region is at least one of the outer regions of the serpentine wire.

7. A method of manufacturing an elastomeric strip according to claim 4 wherein the selected regions are both of the outer regions of the serpentine wire.

8. A method of manufacturing an elastomeric strip according to claim 4 wherein the coating step comprises extruding an elastomeric material through an extruding die onto the support frame.

9. A method of manufacturing an elastomeric strip according to claim 8 wherein during the degradation step the elastomeric material is subjected to a temperature equal to or above the degradation temperature of the degradable material.

10. A method of manufacturing an elastomeric strip according to claim 1 wherein the reinforcing degradable material is a heat degradable polyethylene, and the temperature of the elastomeric material during the coating step is less than the temperature at which the polyethylene degrades during the degrading step whereby no degradation of the polyethylene occurs during the coating step.

11. An elastomeric strip having a support frame comprising longitudinally displaceable frame portions, a coating of elastomeric material secured to the support frame in a coating operation, and selected regions of weaker degraded and non-degraded stronger material reinforcing the longitudinally displaceable frame portions wherein only the degraded material breaks when the elastomeric strip is flexed to allow increased flexibility of the strip, and the non-degraded material prevents undue elongation or stretching of the strip.

12. An elastomeric strip according to claim 11 wherein the support frame comprises a wire frame.

13. An elastomeric strip according to claim 12 wherein the wire frame comprises a serpentinely arranged wire.

14. An elastomeric strip according to claim 13 wherein the selected region is the central region of the serpentine wire.

15. An elastomeric strip according to claim 13 wherein the selected region is at least one of the outer regions of the serpentine wire.

16. An elastomeric strip according to claim 13 wherein the selected regions are both of the outer regions of the serpentine wire.

17. An elastomeric strip as in claims 14, 15 or 16 wherein the degradable material comprises strands of degradable polyethylene material interwoven with the selected region or regions of the longitudinally displaceable frame portions.

* * * * *